United States Patent Office 3,504,745
Patented Apr. 7, 1970

3,504,745
USE OF FOAMS TO PREVENT VERTICAL FLOW IN TAR SANDS DURING IN-SITU COMBUSTION
Lloyd E. Elkins, Tulsa, Okla., assignor to Pan American Petroleum Corporation, Tulsa, Okla., a corporation of Delaware
No Drawing. Filed May 8, 1968, Ser. No. 727,684
Int. Cl. E21b 43/24, 43/16, 33/13
U.S. Cl. 166—261                             7 Claims

ABSTRACT OF THE DISCLOSURE

Tar is produced from a tar sand by injecting a heating fluid into the sand through wells to reduce the tar viscosity. A flooding fluid also may be used. Leakage of fluids vertically along the heated well casing or the cement sheath around the casing is decreased or prevented by injecting a foaming agent solution around the casing. If the leaking fluid is not a permanent gas, a gas is injected after the foaming agent solution to form a foam.

---

Many processes have been proposed for the recovery of tars from the formations in which they occur. In some processes, wells are drilled into the tar sands. These wells are used to heat the sand and tar to a temperature at which the tar is liquid and can be recovered from the wells. In these processes, the sand and tar may be heated by passing a heating medium, such as steam or hot gas, down the well and into the formation. Heat may also be generated by injecting air down at least some of the wells and initiating combustion.

The wells used in these processes have metal casing strings cemented into the tar sands. As long as the tar is cold, a good seal is formed between the casing or the cement sheath around the casing and the tar sand. The cold tar itself is usually a good sealing material. When the tar is heated, however, it becomes liquid and the seal is destroyed. Unfortunately, the first part of the formation to be heated is the part immediately adjacent the injection wells. The metallic casing conducts the heat to upper and lower parts of the formation surrounding such wells decreasing the tar viscosity and breaking the seal between the sand and the cement sheaths around the casings. The result can be a blow-out of the heating medium around an injection well, as described in U.S. Patent 3,221,813 Closmann et al. The heating medium, such as steam or air, may also flow vertically to a relatively barren, highly permeable zone, and then flow horizontally to a producing well through this zone. This is particularly objectionable when air is injected to support combustion. Often, after the formation is heated, it is desirable to inject a flooding fluid, such as water or gas, into the formation, to force the heated oil toward a producing well. The flooding medium can also channel vertically around the casing cement sheath and be lost to the surface or to thief zones.

An object of this invention is to stop the leakage of heating medium up around the casing cement sheath surrounding wells in tar sands when the casing becomes warm. Another object is to stop vertical leakage of flooding fluids, such as water or gas, injected after the sand and tar are heated. Still another object is to prevent or decrease the flow of combustion-supporting air vertically around the injection well to highly permeable zones, through which it can flow easily to a producing well, thus bypassing the zone in which combustion is desired. Still other objects will be apparent to those skilled in the art from the following description and claims.

I have found that vertical flow of fluids along the cement sheath surrounding wells in tar sands can be prevented or at least greatly decreased by injecting a foaming agent solution around the cement sheath. If the leaking fluid is a fixed gas, such as air, leakage of this gas into the foaming agent solution automatically generates a foam which blocks further leakage. If the leaking fluid is a liquid, such as water, or is a condensable gas, such as steam, then a gas, such as air, should also be injected around the cement sheath after the foaming agent solution to generate the blocking foam.

My invention will be better understood from the description of an example. An operation where the problem occurred will first be described. Wells were drilled into a particularly rich tar zone of the Athabasca tar sands in Alberta, Canada. This zone was below a thick shale section. Above the shale was a series of zones leaner in tar and having relatively high permeabilities. Casing was run to the botoms of the wells and was cemented in place. The cement extended some 200 to 250 feet above the tar sand itself. The casings were perforated only below the shale streak to confine at least the initial operation to the rich tar zone.

Air was injected through the casing perforations in one of the wells and combustion was initiated. Even after combustion was initiated, oxygen appeared at the producing wells. This indicated the air was bypassing the combustion zone. Investigation showed the air was traveling through the zones above the shale streak. For example, perforation of the casing above the shale streak at a producing well showed there as considerable air pressure behind the casing above the shale streak. A water solution of radioactive material injected through perforations below the shale streak at the warm injection well rapidly flowed upwardly past the shale streak and disappeared into the leaner, high permeability zones above the shale streak.

The air did not break through to the top of the injection well around the casing. This was probably because of a strong, hard formation above the tar sand to which the cement around the casing made a good bond. The air certainly did flow upwardly around the casing cement sheath. In the tar zone, this was undoubtedly due to tar becoming so warm and non-viscous that no seal was maintained around the cement. The leakage past the shale was probably due partly to melting of any tar in the shale or between the shale and cement and partly due to the naturally weak nature of the shale.

In a later arrangement, the injection well was completed by cementing casing in the well with a small pipe outside the casing and extending a little below the bottom of the shale streak at about 1,000 feet. This small pipe was perforated at 1,004 and 1,005 feet. The casing was perforated below 1,100 feet. The formation was hydraulically fractured through the perforations below 1,100 feet. Tar, adjacent the fracture, was ignited and injection of air at a rate of about 850,000 to about 900,000 standard cubic fet per day at an injection pressure of about 750 pounds per square inch gauge was begun.

Even before the ignition procedure, a one-percent aqueous solution of a foaming agent was injected through the small pipe outside the casing and into the top of the 120-foot section of rich tar sand below the shale streak. The composition of the OK liquid used as a foaming agent is described in U.S. Patent 3,330,346 Jacobs et al. For the first thirty days, the foaming agent solution was injected at a rate of about two barrels per day (42 U.S. gallons per barrel). The rate was then increased to about four barrels per day, one barrel of solution being injected rather rapidly every six hours.

After about two weeks of injecting at this higher rate, plugging occurred so that further injection of foaming agent solution was much more difficult. In spite of the plugging, it was possible to continue injecting about a quarter to a third of a barrel of foaming agent solution every few days.

During the first two days of air injection, oxygen was detectable in the gas produced at the four producing wells of the 5-spot system. Thereafter, the oxygen disappeared and carbon dioxide appeared. As high temperature reached each producing well, the well was shut-in to divert the combustion front toward the other producing wells. High temperature reached all four producing wells without oxygen appearing at any of them. Since bypassing has occurred in similar arrangements before and did not occur in this process where the foaming agent solution was injected, injection of the foaming agent solution obviously was able to prevent the bypassing.

Of even more significance, it was found desirable to open one of the producing wells to the zones behind the casing above the shale streak. No air pressure was found in these zones. This showed that no air had been able to flow upwardly past the shale streak sealed by foam at the injection well.

While OK liquid foaming agent was used in the example, it will be apparent that other water-soluble foaming agents, such as those named in U.S. Patent 2,866,507 Bond et al., can also be used. An oil solution of an oil-soluble agent, such as those named in U.S. Patent 3,207,218 Holbrook, can of course be used instead of the water solution, if desired. Concentrations of the agents in the solutions may vary between about 0.1 and about 5 percent by weight, but preferably should be about 1 or 2 percent by weight.

The foaming agent solution should be injected over a rather narrow vertical interval, preferably not more than about ten feet. The rate of injection of the solution may vary from several hundred gallons per day, particularly at the begnning, to a rate of less than ten gallons per day, which is preferred, after the region near the well has been filled with foaming agent solution.

The foaming agent solution may be injected in large batches several days apart, but preferably is injected at least daily. In case higher temperatures reach the foaming agent solution, substantially continuous injection, that is, more frequent than once a day, is greatly preferred to cool the formation and permit the formation of longer lasting foams.

Emphasis to this point has been placed on treating of injection wells. Under some circumstances, it may be advisable to treat the producing wells with foaming agent solution. As in the case of the injection wells, the most important action is to fill the highly permeable zone or zones with foaming agent solution. Then, if air tries to flow vertically from the fracture to the permeable zone and through the permeable zone to the producing well, it will form a foam which blocks flow through the highly permeable zone near the producing well. This is particularly important near the end of the combustion operation as the combustion zone approaches the producing well. Substantially continuous injection is, again, greatly preferred so, if heat breaks the foam, additional cool foaming agent solution is made available for forming a new foam. The method and rate of injection, together with the type of foaming agent solution, and amount injected can, however, be either the same as or different than those used in the injection well. Injection of air or other fixed gas after foaming agent solution at producing wells is frequently advisable to prevent excessive backflow of foaming agent solution out of the formation into the producing well.

The section of Athabasca tar sands treated as described above had a natural temperature of about 45° F. At this temperature, the tar had a viscosity of something like a million centipoises. At 100° F., the viscosity was about 100,000; at 200° F., the viscosity was about 1,000; and at 300° F., the viscosity was only about 100 centipoises. In the test, about two percent of the tar was burned to raise the average temperature to between about 200° F., and about 250° F. By injecting air at a higher rate, it is possible to cause the combustion to move more rapidly through the fracture to the producing wells. In this way, the cost of the operation can be reduced. Of course, the amount of tar burned and the heat generated are also reduced with a corresponding decrease in the average temperature of the formation and an increase in the final average viscosity of the tar. The tar viscosity can be decreased farther than it was in the test by injecting air somewhat more slowly so the combustion front travels more slowly through the fracture and more heat is generated.

My process is applicable to any tar sands or other formations containing highly viscous oil where the tar or oil is sufficiently viscous to require heating so it can be produced at an economical rate by ordinary means. For the less viscous tars and oils, less burning is required since less viscosity reduction is needed.

It has been suggested that a fracture be formed before the burning operation begins. This is very much preferred in my process since it insures carrying out the burning operation at least about 20 or 30 feet vertically spaced from the zone to be plugged by foam. This means that the heat does not too seriously affect the stability of the foam. In many formations, however, at least one permeable streak already exists. It is possible to carry out the combustion operation in such a streak if it contains enough oil to burn. Foaming agent solution can then be injected into any zones vertically remote from the combustion zone or streak to prevent leakage of air vertically along the cement sheath. Even though no fracture is formed before combustion begins, it will be necessary to fracture the formation with air pressure during combustion in order to continue the combustion operation. The fracture need not, however, be formed before the combustion begins. The preliminary fracturing step is simply advantageous because it controls the level or levels of the burning operation.

Several alternates and variations have been discussed above. Still others will be apparent to those skilled in the art. For example, vertical travel of heating fluid or flooding fluid may be downwardly along the cement sheath to a highly permeable water zone through which the fluid can flow to a producing well. In this case, the foaming agent solution is injected below the level at which the heating or flooding fluid is injected. If a relativevly impermeable streak is available, such as the shale streak in the example, the foaming agent solution should preferably be injected adjacent this impermeable streak on the side closest to the level at which the heating or flooding fluid is injected. Oil may be produced from the well or wells into which the heating medium is injected or the oil may be recovered from other wells. Flooding fluid may be injected into the same wells as the heating fluids or may be injected into other wells. Still other alternates and variations exist. Therefore, I do not wish to be limited to the described examples, alternates and variations, but only by the following claims.

I claim:

1. In a method for recovering tar from a tar-bearing underground formation in which metallic casing is cemented into said formation in a well penetrating said formation, in which formation the temperature is sufficiently low to cause the tar to form an effective seal against vertical flow along the outside of the cement surrounding said casing, in which method air is injected through said well into said formation, and underground combustion is initiated to heat the formation and the tar to decrease the viscosity of the tar so it may be more easily recovered, the improvement comprising injecting a foaming agent solution through said well and into the formation at a level vertically displaced from the level at which said air is injected, and continuing to inject air, whereby when air tends to flow vertically along the cement through tar melted by heat conducted along the casing, this tendency is overcome by the formation of foam when the air penetrates the foaming agent solution.

2. The method of claim 1 in which the heating step is followed by a flooding step in which a flooding fluid is injected into said formation to force the heated oil toward a producing well from which the oil can be recovered.

3. The method of claim 1 in which a relatively impermeable streak is present in said formation and said foaming agent solution is injected adjacent the relatively impermeable streak on the side of the streak closest to the level at which said air is injected.

4. The method of claim 1 in which said foaming agent solution is injected at least once a day to overcome adverse effects of heat on the foam stability.

5. The method of claim 1 in which oil is produced principally from a second well and in which foaming agent solution is also injected into said formation at said second well in a part of said formation vertically displaced from the portion of said formation into which the air is injected at the injection well.

6. The method of claim 1 in which the principal problem is leakage of air upwardly around the cement sheath and said foaming agent solution is injected above said level at which said air is injected.

7. The method of claim 1 in which the principal problem is leakage of air downwardly into a water-bearing zone below the oil-bearing zone of said formation and said foaming agent solution is injected below said level at which said air is injected.

References Cited
UNITED STATES PATENTS

| | | | |
|---|---|---|---|
| 3,221,813 | 12/1965 | Closmann et al. | 166—272 X |
| 3,349,843 | 10/1967 | Huitt | 166—272 X |
| 3,366,175 | 1/1968 | Ferrell et al. | 166—273 |
| 3,369,601 | 2/1968 | Bond et al. | 166—258 |
| 3,372,750 | 3/1968 | Satter et al. | 166—272 |
| 3,410,344 | 11/1968 | Cornelius | 166—303 |

STEPHEN J. NOVOSAD, Primary Examiner

U.S. Cl. X.R.

166—269, 272, 274, 292